Figure 3:
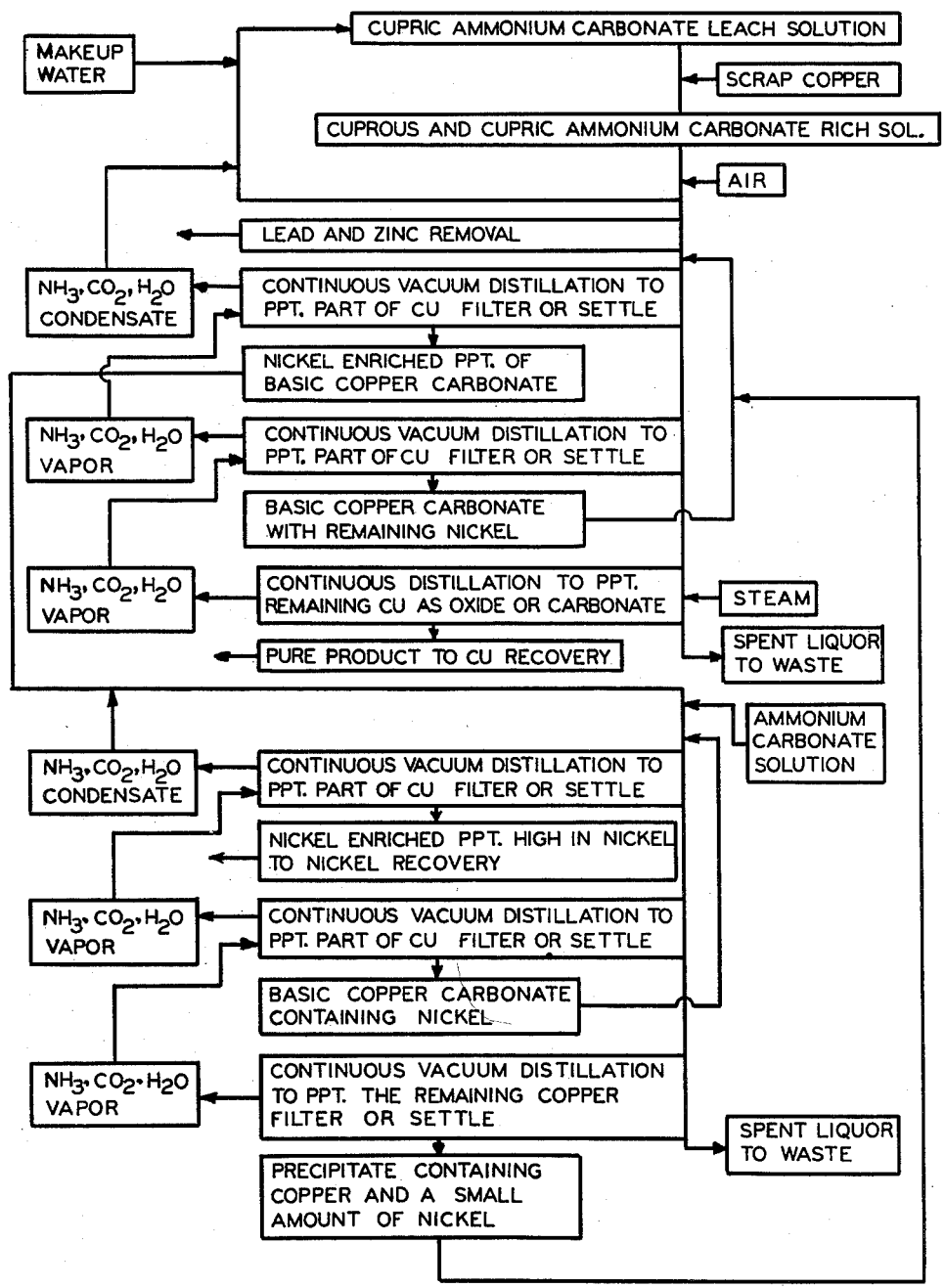

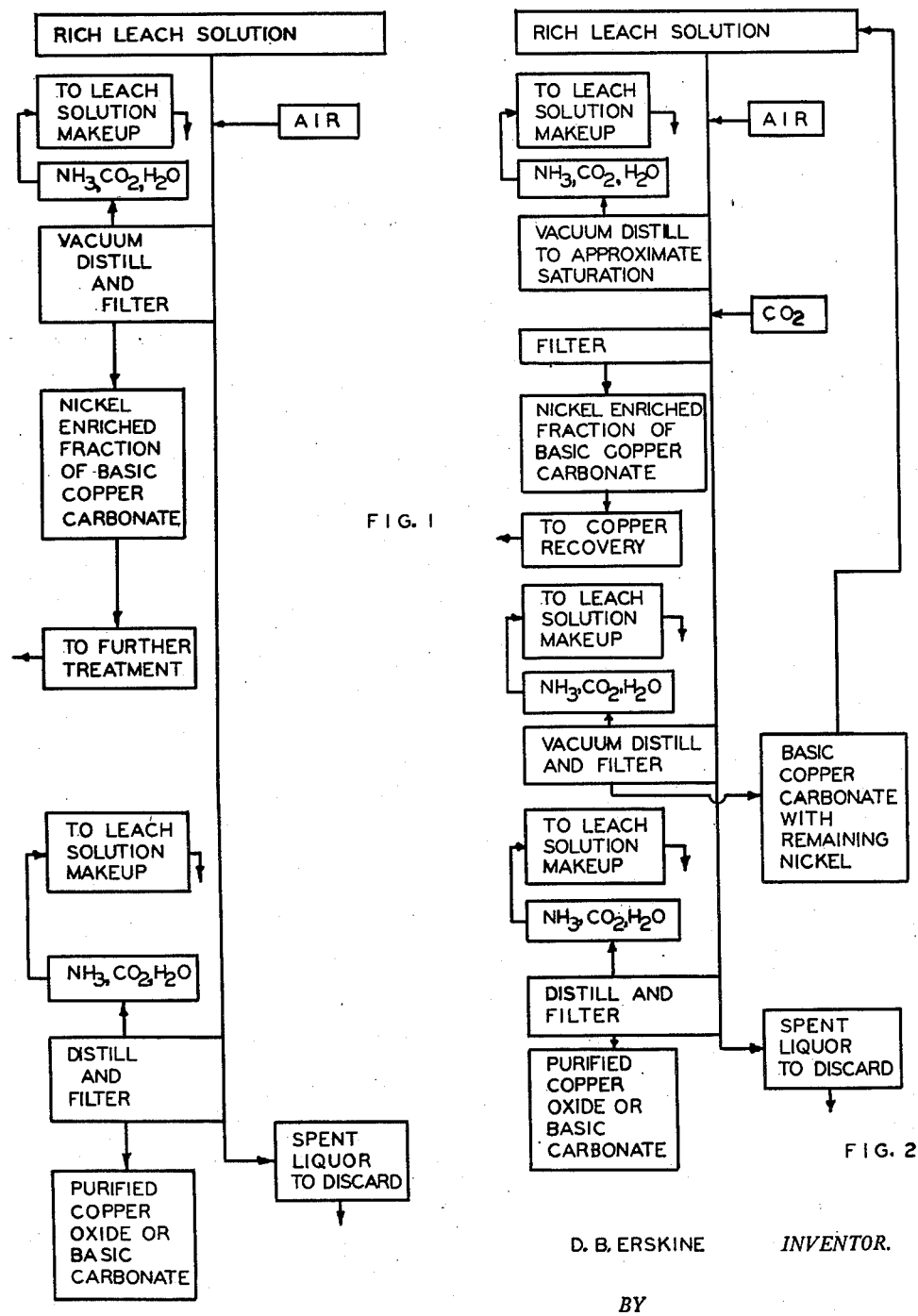
Dec. 28, 1954  D. B. ERSKINE  2,698,220
RECOVERY OF NICKEL AND COPPER VALUES FROM COPPER
AMMONIUM CARBONATE LEACH SOLUTIONS
Filed Nov. 30, 1950  3 Sheets-Sheet 1
D. B. ERSKINE  INVENTOR.
BY William H Brown
ATTY.

Dec. 28, 1954  D. B. ERSKINE  2,698,220
RECOVERY OF NICKEL AND COPPER VALUES FROM COPPER
AMMONIUM CARBONATE LEACH SOLUTIONS
Filed Nov. 30, 1950  3 Sheets-Sheet 3

INVENTOR.
D. B. ERSKINE
BY
William H Brown

United States Patent Office 2,698,220
Patented Dec. 28, 1954

2,698,220

RECOVERY OF NICKEL AND COPPER VALUES FROM COPPER AMMONIUM CARBONATE LEACH SOLUTIONS

Donald B. Erskine, Elizabeth, N. J., assignor to Calumet & Hecla, Inc., a corporation of Michigan Application November 30, 1950, Serial No. 198,411

7 Claims. (Cl. 23—61)

This invention relates to purification of copper-ammonium carbonate leach solutions and has for its object the separation of nickel from the copper content of such solutions.

One of the well-known methods of dissolving metallic copper is to leach with cupric ammonium carbonate solution. When the solution contacts the metal, a large part of the cupric copper content of the solution reacts with more copper to form the corresponding cuprous compound. Part of the resulting solution is then oxidized, as by blowing with air, whereby the cuprous compound is converted back to the cupric state and can then be used together with additional ammonia and $CO_2$ in a new leach solution for dissolving more metallic copper. Copper is precipitated from the remaining portion of the enriched solution by distilling off ammonia and $CO_2$ which later are utilized in preparing the new leach solution. These steps are ordinarily carried out as a continuous process.

When this process is applied to scrap copper, certain metallic impurities are encountered, sometimes in proportions which can be tolerated and sometimes in proportions which require purification. One of these metallic impurities which is frequently encountered is nickel, a metal which is valuable enough to warrant consideration of recovery from solution rather than in the slag from the smelter where it would be lost or very difficult to recover. Nickel, even in proportion as low as about 0.01% lowers the electrical conductivity of copper to an extent to be objectionable. Accordingly it is an object of the present invention to provide an improved wet process for recovery of nickel and copper values from the above described type of copper leaching solution. A further object is to recover from the above described type of leaching solution a nickel-rich fraction containing substantially all the nickel content together with a portion of the copper in the form of basic copper carbonate substantially free from copper oxide and leaving a nickel-poor solution, containing little or no nickel, from which copper can be recovered in a highly purified condition with respect to nickel. Other and more limited objects will become obvious as the description proceeds.

I have now discovered that these objectives can be attained through precipitation of the nickel-rich copper fraction from aqueous solution under critical conditions. This can be accomplished in several different ways as will now be indicated briefly.

One procedure is to remove lead and zinc, if present, by known methods, e. g., by the method of U. S. patent to Kenny and Klein No. 2,488,201, oxidize the copper in the solution nearly all to the cupric state and then vacuum distill whereby ammonia is removed to a sufficient extent to cause precipitation of copper in the form of the basic carbonate. When most or all of the nickel has been precipitated, along with a portion of the copper, the precipitate is removed, suitably by filtration or sedimentation, after which further distillation serves to precipitate the copper, as the basic carbonate or the oxide as desired depending upon the pressure employed.

A variation (which may under some conditions be preferable) is to omit the zinc and lead removal and precipitate lead, zinc, and nickel together. The lead and zinc carbonates, come down preferentially to the nickel under these conditions but do not separate cleanly therefrom. Zinc and/or lead can be removed from the copper in this way when there is no nickel present.

A third useful variant is to distill off the $NH_3$ to approximately the point of incipient precipitation and then pass in $CO_2$ whereby the nickel, lead and zinc are precipitated. If the lead and zinc have been previously removed, then, of course, only the nickel will be precipitated and this may be considered a fourth variant. If there is no nickel present, zinc and/or lead may be removed in this way.

In all of these variants, the common condition for the preferential precipitation of nickel is that a suitably oxidized leaching solution having a suitable concentration of copper, $NH_3$ and $CO_2$ has its $NH_3:CO_2$ molecular concentration ratio reduced to a sufficient degree to precipitate the nickel enriched fraction of the copper as basic carbonate free, or substantially free, from copper oxide. Ordinarily precipitation is induced by reducing the $NH_3$ content while maintaining the $NH_3:CO_2$ ratio, but if the $NH_3$ concentration is low enough, passing in $CO_2$ will cause precipitation. On precipitation by distillation at atmospheric pressure, $CO_2$ will be lost along with the $NH_3$ to the extent that a considerable part of the copper will come down as the oxide, with respect to which nickel is not preferentially precipitated. The precipitation of nickel and unavoidably also copper cannot (without sacrifice in quality of product) be discontinued until all, or nearly all, of the nickel has come down, either in one step or in a series of steps.

It is essential to keep the $NH_3:CO_2$ ratio down as the ammonia is removed, or $CO_2$ added, to avoid precipitation of copper as oxide. Actually, it is just at the point of precipitation when concentration of $NH_3$ and the $NH_3:CO_2$ ratio must both be correct. Thus, precipitation may be satisfactorily accomplished if the ammonia concentration is brought down first (or happens to be low enough already) and then the $CO_2$ concentration is brought up by passing in $CO_2$.

It should be possible to avoid the necessity for vacuum distillation by passing in $CO_2$ at atmospheric pressure. I have found this to be feasible but the process is more practical in the case of the best leaching solutions if the $NH_3$ is first reduced almost to the point of precipitation and the $CO_2$ is then passed in. If the ammonia content is not first reduced (or already low enough), it may be necessary to carbonate under pressure in order to achieve suitable conditions.

A further variant is to reduce the copper solution partly or entirely to the cuprous state, and then distill under vacuum. Cuprous copper comes down preferentially to lead, zinc, nickel, and cupric copper. It is possible to separate by fractional precipitation lead, cuprous copper, zinc, nickel, and cupric copper in the form of basic carbonates.

In order to precipitate the nickel completely or nearly so, it is necessary to precipitate a substantial portion of the copper along with it. In accordance with the present invention, the nickel may be precipitated so nearly completely that the filtrate is to all intents and purposes nickel-free while still containing sixty per cent or more, perhaps as much as eighty or eighty-five per cent of the copper. (It may be in some cases, unnecessary to precipitate all the nickel and cheaper not to do so. The advantages of the invention are substantially realized if precipitation is continued until from 20 to 50 per cent of the copper has been precipitated as basic carbonate.) The resulting nickel-free filtrate can then be worked up just as if it had never been contaminated with nickel. The resulting precipitate containing forty per cent or less of the copper and enriched in respect to nickel can be worked up as desired, smelted and used in formulation of copper-nickel alloys or redissolved in ammonium carbonate solution and again subjected to the same treatment whereupon a smaller precipitate is obtained which is still further enriched in nickel and a filtrate is obtained which is low in nickel and contains a major portion of the copper which came down in the first precipitate. Various dispositions of the nickel-rich fraction are possible but I prefer those illustrated in the accompanying drawings.

Figure 4:
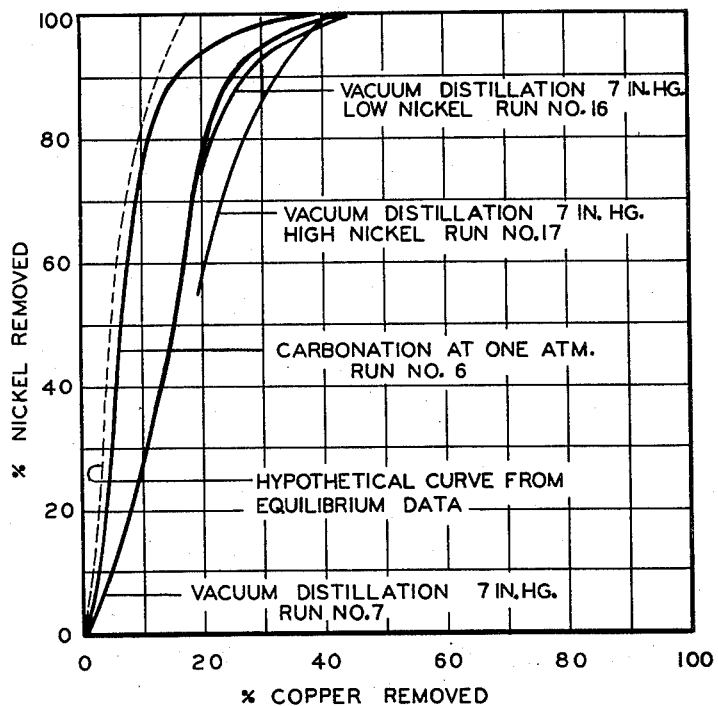
Figure 5:
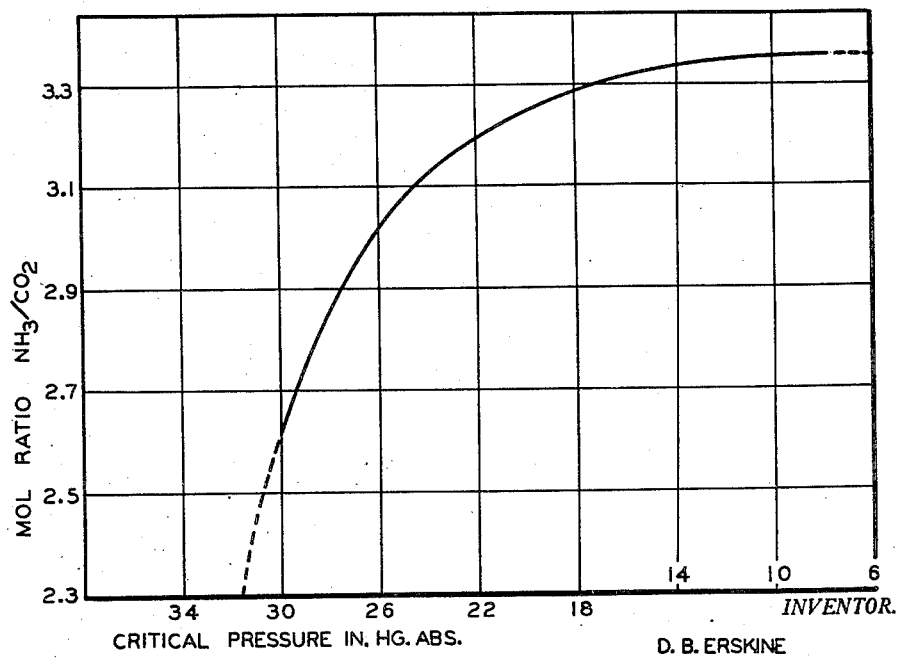

In said drawings, Figs. 1 to 3 inclusive are flow sheet diagrams illustrating variant forms of the invention any of which may be either batch or continuous processes; Fig. 4 is a graphic representation of the results of precipitation under somewhat different conditions; and Fig. 5 is a graph showing the critical vacuum and NH₃:CO₂ molar concentration ratios for precipitation of basic copper carbonate with the nickel and substantially free from copper oxide.

A typical leaching solution ready to be passed into contact with metallic copper for enrichment in copper content might contain 30 grams per liter of copper (Cu) largely in the cupric state, about 60 grams per liter of NH₃, and about 40 grams per liter of CO₂. Likely the solute is a mixture of cupric ammonium carbonate, cuprous ammonium carbonate, ammonium carbonate and ammonium hydroxide, but for convenience, I prefer a simpler (less specific, but yet practicable) concept according to which Cu, NH₃, and CO₂ are regarded as the components and as being independently variable. The copper content of the leaching solution would be largely in the cupric state, the enriched solution ordinarily largely in the cuprous state depending upon the amount of copper dissolved. I prefer ordinarily to oxidize the solution to be purified to the extent that more than 95%, desirably 99%, of the copper is in the cupric state. In practice, I prefer to oxidize a rich solution up to about 99% to 100% cupric copper by passing air upwardly through a packed tower while allowing the rich solution from the leach to flow downwardly therethrough. At this stage, the solution should contain from 10 to 100, preferably 30 to 60, grams per liter cupric copper, 0 to 1 gram per liter cuprous copper, 20 to 100, preferably 30 to 60 grams per liter NH₃, and 20 to 80, preferably 30 to 60 grams per liter CO₂, remainder water and minor quantities of impurities.

Referring now to the embodiment of the invention illustrated in Fig. 1 by way of flow diagram, it will be seen that the rich solution (high in cuprous copper) which has been contacted with the metallic copper scrap is first thoroughly oxidized to an extent to convert all cuprous copper to the cupric state. (Some cuprous copper can be tolerated but since it will come down with the nickel, it is best to oxidize 100% to cupric state.) The zinc and lead are removed by the process of the Kenny and Klein patent, supra, or otherwise, either before or after the oxidation step, if they are present, or they may be allowed to come down with the nickel if present in such small amount as to be tolerable, or if the amount of nickel is small enough to be discarded. I then vacuum distill and filter, sending the nickel-rich precipitate to be further worked up by a subsequent treatment such as described below in connection with Fig. 3, or by smelting or otherwise, sending the volatile NH₃, CO₂, and H₂O back to leach solution makeup. By reference to Fig. 4, the curve labeled "Run 7," it will be seen that under the conditions of that experiment when the nickel has been precipitated to the extent of 85% or 95%, the copper will have precipitated to the extent of about 22%, or about 30%, respectively. If the solution originally contained 50 grams per liter of copper and 1 gram per liter of nickel, the precipitate would contain 0.85 or 0.95 gram of nickel to 11 or 15 grams of copper. Obviously further separation might be desirable. Furthermore, there would remain in solution 0.15 or 0.05 gram per liter of nickel, which, if left in the copper would amount to about 0.04% or 0.01%. If the amount of nickel remaining in solution is too much to tolerate, a further portion of the nickel can be precipitated, if necessary almost 100%, in which case, judging by Run No. 7, a little more than 40% of the original copper will have come down. While Run No. 7 is typical of batch runs, the results vary somewhat. This second fraction can then be returned to the rich solution as indicated. The copper remaining in solution can then be brought down free from nickel, or with a very low nickel content. In Figure 3, there is shown by way of flow diagram a process wherein the initial precipitate is redissolved, the new solution redistilled, and some of its copper content returned to the process, along with some nickel, of course, and a copper fraction much richer in nickel is obtained. In Fig. 2 there is illustrated a form of the invention wherein NH₃ and some CO₂ are distilled off until the solution is near saturation. CO₂ may be passed in at atmospheric pressure or at higher or lower pressure. If passed in at superatmospheric pressure, the removal of NH₃ may be reduced or eliminated entirely. By reference to Fig. 4, it will be seen that somewhat less copper was precipitated per unit of nickel by the process of Fig. 2 than by the process of Fig. 1.

It will be noted that in the procedure outlined in Fig. 1 there is no return of precipitate to the process while in Fig. 2 after the first nickel enriched fraction containing most of the nickel has been removed, a further fraction which contains the remainder of the nickel is precipitated and returned to the process. It might be that the first precipitate would contain about 80 per cent of the nickel and only 20 per cent of the copper. This would be typical if the original oxidized solution contained 1 per cent nickel based on copper. The second fraction might then contain the remaining 20 per cent of the nickel and another 20 per cent of the copper, the filtrate being nickel free and containing 60% of the copper. The feature of returning the second fraction can be as well carried out in the case where no CO₂ is passed in (Fig. 1). Likewise this feature could be omitted from the procedure of Fig. 2. In the Fig. 1 procedure, the amount of copper precipitated would be such that the nickel would all be precipitated therewith or, at least it would be reduced far enough to meet such specifications as might be necessary to be met. If the feature of the second precipitate were omitted from the procedure of Fig. 2, there again the amount of copper precipitated in the first precipitate would be large enough to eliminate all the nickel or, at any rate, enough to meet required specifications.

While Figs. 1 and 2 do not, like Fig. 3, illustrate entire processes beginning with scrap copper, ammonia, and CO₂, they obviously may be considered as being parts of such complete procedures. The "rich leach solution" implies the previous step of leaching the scrap copper containing a content of nickel. The return of volatiles to leach solution makeup implies continuity, either in the form of a continuous process or succeeding batches. While the continuous process is preferred, the batch process is feasible and within the scope of the invention. It will be seen that these diagrams describe equally well the batch and continuous types of procedure. The contemplated plant will be a continuous process wherein the conditions within the precipitation still will be approximately constant and a close approach to theoretical equilibrium can be expected, especially where there are a plurality of returns of mixed nickel and copper precipitates. In Fig. 4 I have shown (dotted) an hypothetical curve based upon experimentally determined equilibrium data indicating what could be expected if complete equilibrium were achieved between precipitate and liquor. This hypothetical curve has not been determined to any high degree of accuracy but is to be regarded as an approximation only.

For best results several factors should concur:

(1) The solution should be highly oxidized, that is, the copper should be all, or nearly all, in the cupric state. I prefer that the copper be 95% to 100%, most desirably 99% to 100% in the cupric state.

(2) The copper should be precipitated all, or nearly all, as basic cupric carbonate, little or none of it being precipitated as oxide. This is important because the oxides of nickel and copper precipitate together, and little or no enrichment of either copper fraction with respect to nickel results from the precipitation of copper oxide. Nickel, however, concentrates heavily in the basic cupric carbonate precipitate which comes down under vacuum distillation or carbonation, or a combination of the two.

(3) The NH₃ and CO₂ concentrations must be brought within suitable limits for effecting precipitation of copper from the enriched solution as basic cupric carbonate without any great amount of copper oxide coming down. Practically speaking, the optimum conditions can be had by distillation, carbonation or a combination of the two. Beginning with fully oxidized rich solutions in the concentration ranges above indicated, I select a suitable degree of vacuum and proceed to distill until precipitation of nickel is complete. Alternatively, I distill off ammonia, (preferably under vacuum but not necessarily so) approximately to incipient precipitation and then pass in CO₂ until precipitation of nickel is complete. The precipitation may be split up, an intermediate fraction being returned to the process as indicated in Fig. 2 or, if preferred, the nickel-rich precipitate may be redissolved (as in Fig. 3) and the same type of precipitation carried out for further concentration of the nickel into a smaller fraction of the copper. Obviously any precipitate of basic copper carbonate containing nickel can be redissolved and a further separation effected by repetition of the fundamental process.

During vacuum distillation, the $NH_3:CO_2$ molar concentration ratio should be between 2.3:1 and 3.4:1 and the pressure should be below 32 inches of mercury absolute and should be so related to the $NH_3:CO_2$ ratio as to be represented by a point lying to the right of the curve in Fig. 5. Most desirably, the absolute pressure should be below 10 inches of mercury and the $NH_3:CO_2$ molar concentration ratio should be between 2.3:1 and 3.4:1 while precipitation of nickel and copper is effected either by reduction of the $NH_3$ or addition of $CO_2$. Fig. 5 shows pressures only down to 6 inches Hg absolute but the expression "at the right of the curve in Fig. 5" is to be understood as including lower pressures than 6 inches Hg, e. g., one inch Hg or less.

In Fig. 5 I have shown the critical pressures with respect to various molar concentration ratios of $NH_3:CO_2$ for obtaining precipitates of basic cupric carbonate, free or substantially free from oxide. The curve approximates the borderline between conditions giving a precipitate free from oxide and those giving a precipitate containing oxide. It will be understood that a small proportion of oxide can be tolerated without entirely losing the benefits of the invention and, accordingly, I desire to include such conditions as correspond approximately to positions on or at the right of the curve in Fig. 5.

EXAMPLE I

In this series of tests, 250 ml. batches of rich leach solutions, fully oxidized, were evaporated under a vacuum of about 23 to 24 inches of mercury. (Pressure 6 to 7 in. Hg absolute.) Hydrogenated vegetable oil was added to prevent foaming and bumping. In the case of each sample, the vacuum distillation was continued until the volumes of distillate were as shown in the table below. The results of the distillations are also shown in the table. The precipitates were blue-green in color indicating basic carbonate. (Gray precipitates indicate the presence of cupric oxide.) The information contained in the last two lines of the table are shown graphically in Fig. 4. (Curve labeled Run No. 7.)

Table I

| Sample No. | 1 | 5 | 3 | 4 | 5 | 6 | 7 | 8 | 9 | 10 |
|---|---|---|---|---|---|---|---|---|---|---|
| Initial Volume (ml.) | 250 | 250 | 250 | 250 | 250 | 250 | 250 | 250 | 250 | 250 |
| Vol. of Dist. (ml.) | 0 | 52 | 81 | 93 | 97 | 105 | 118 | 119 | 127 | 200 |
| Vol. of Fil. (ml.) | 250 | 192 | 158 | 135 | 131 | 120 | 108 | 108 | 93 | 22 |
| $NH_3$ Removed (g.) | 0 | 83.7 | 9.60 | 10.37 | 10.32 | 10.86 | 10.96 | 11.16 | 11.38 | 13.37 |
| Cu Removed (g.) | 0 | 0.14 | 0.43 | 1.03 | 2.18 | 2.72 | 2.82 | 3.02 | 3.24 | 5.23 |
| Ni Removed (g.) | 0 | .005 | .024 | .094 | .091 | .147 | .141 | .151 | .156 | .158 |
| $NH_3$ in filtrate (g.) | 14.12 | 5.75 | 4.52 | 3.75 | 3.80 | 3.26 | 3.16 | 2.96 | 2.74 | 0.75 |
| CU in filtrate (g.) | 5.98 | 5.84 | 5.55 | 4.95 | 5.03 | 4.61 | 4.41 | 4.36 | 3.90 | 1.08 |
| Ni in filtrate (g.) | 1.58 | .153 | .134 | .064 | .067 | .011 | .016 | .007 | .002 | 0 |
| Percent $NH_3$ Removed | 0 | 59.3 | 68.0 | 73.5 | 73.1 | 76.9 | 77.6 | 79.1 | 80.6 | 94.7 |
| Percent Cu Removed | 0 | 2.4 | 7.1 | 17.1 | 16.0 | 23.0 | 26.1 | 27.1 | 34.8 | 82.0 |
| Percent Ni Removed | 0 | 3.5 | 15.6 | 59.5 | 57.6 | 93.3 | 89.9 | 95.8 | 98.7 | 100 |

EXAMPLE II

A fully oxidized rich leach solution containing about 56 grams per liter of $NH_3$ was evaporated down to about half its initial ammonia content by gentle boiling at atmospheric pressure until a precipitate just began to form. Carbon dioxide was then passed in at atmospheric pressure with the results indicated in the following table.

Table II

| Sample No. | 1 | 2 | 3 | 4 | 5 | 6 | 7 |
|---|---|---|---|---|---|---|---|
| Minutes during which $CO_2$ added | 0 | 0.5 | 1.0 | 2.0 | 4.0 | 6.0 | 8.0 |
| Cu in filtrate (g./l.) | 34.8 | 33.8 | 32.2 | 28.8 | 24.7 | 22.5 | 24.7 |
| $NH_3$ in filtrate (g./l.) | 28.4 | 28.3 | 25.3 | 27.0 | 26.2 | 26.8 | 26.7 |
| $CO_2$ in filtrate (g./l.) | 39.4 | 40.4 | 42.5 | 40.4 | 39.6 | 41.8 | 43.7 |
| Ni in filtrate (g./l.) | .862 | .746 | .361 | .074 | .015 | .006 | .002 |
| Percent Cu in ppt | | | 32.5 | 30.7 | 32.6 | 36.2 | 36.6 | 36.7 |
| Percent Ni in ppt | | 6.20 | 5.86 | 4.36 | 3.28 | 3.24 | 3.32 |
| Percent $NH_3$ removed | | 3.5 | 10.9 | 4.9 | 7.7 | 5.6 | 6.0 |
| Percent Cu removed | | 2.9 | 7.5 | 17.2 | 29.0 | 35.6 | 29.0 |
| Percent Ni removed | | 13.5 | 58.2 | 91.5 | 98.3 | 99.3 | 100 |

The relation between the percentage of copper and nickel precipitated, based upon the weights thereof originally present in the sample, is shown in the last two lines of the foregoing table and in Fig. 4 by the curve labeled "Run No. 6."

EXAMPLE III

A few tests were run under conditions similar to the procedure of Example I except that the nickel content of the starting solutions were different. In "Run No. 16" the nickel content was low, only about one third of one per cent of the copper while in "Run No. 17" it was about three per cent of the copper. The starting solution for "Run No. 16" contained 65.6 grams per liter of ammonia, 30.1 grams per liter of Cu and 0.0771 gram per liter of Ni; for "Run No. 17," 68 grams per liter ammonia, 29.6 grams per liter of Cu and 0.832 gram per liter of Ni. The $CO_2$ concentration in both cases was 55.0 grams per liter. The relative proportions of the two metals present in the starting solution which were precipitated were as follows:

| | Run No. 16 | | | Run No. 17 | | |
|---|---|---|---|---|---|---|
| Percent Cu pptd | 18.0 | 33.4 | 46.2 | 19.6 | 33.3 | 40.6 |
| Percent Ni pptd | 69.4 | 95.2 | 100 | 58.2 | 90.1 | 98.8 |

These data are shown in Fig. 4. The precipitation of nickel begins earlier with respect to copper precipitation when the concentration is high but ends later. Only the upper ends of these curves were investigated.

While I have described and illustrated my invention foregoing with reference to present preferred embodiments, variations may be made without departing from the spirit and essential scope thereof, e. g., higher concentrations of copper up to 200 grams per liter can be used successfully.

Having thus described my invention, what I claim is:

1. A process for separating an aqueous, ammoniacal copper carbonate leach solution containing a minor proportion of nickel not exceeding about 6 grams per liter into a solid phase containing a higher nickel to copper ratio than said solution and a liquid phase substantially completely free from nickel, comprising the steps of preparing as a starting composition an aqueous solution containing from 20 to 100 grams per liter of $NH_3$, 20 to 80 grams per liter of $CO_2$, from 10 to 100 grams per liter of copper in cupric state and at least 0.01 per cent of nickel based upon the copper, thereafter distilling off ammonia to approximately the point of incipient precipitation of copper and then reducing the $NH_3:CO_2$ concentration ratio, while maintaining the pressure at a point to prevent precipitation of copper as oxide, until from 20 to 50 per cent of the copper has been precipitated as basic copper carbonate and separating the resulting precipitate from the resulting liquid phase whereby a substantially nickel free liquid phase is obtained containing from 50 to 80 per cent of the copper.

2. The invention as defined in claim 1 further characterized in that reduction of the $NH_3:CO_2$ concentration ratio at the pressure conditions set forth is accomplished by vacuum distillation.

3. The invention as defined in claim 1 further characterized in that reduction of the $NH_3:CO_2$ concentration ratio is accomplished by passing $CO_2$ into the solution under the pressure conditions set forth.

4. A process according to claim 1 wherein the starting solution contains from 30 to 60 grams per liter of carbon dioxide, from 30 to 60 grams per liter of copper and from 30 to 60 grams per liter of ammonia.

5. The invention as defined in claim 1 further characterized in that reduction of the $NH_3:CO_2$ ratio is effected by distillation at an absolute pressure not exceeding 10 inches of mercury.

6. The invention as defined in claim 1 further characterized in that reduction of the $NH_3:CO_2$ ratio is effected by addition of $CO_2$ at a pressure not substantially below atmospheric.

7. A process for separating an aqueous, ammoniacal copper carbonate leach solution containing a minor proportion of nickel not exceeding about six grams per liter into a solid phase containing a higher nickel to copper ratio than said solution and a liquid phase substantially completely free from nickel, comprising the steps of preparing as a starting composition an aqueous solution containing from 20 to 100 grams per liter of $NH_3$, 20 to 80 grams per liter of $CO_2$, from 10 to 100 grams per liter of copper in cupric state and at least 0.01 per cent of nickel based upon the copper, thereafter (1) distilling said solution at an absolute pressure not above 10 inches of mercury until a major portion of the nickel content and a portion of the copper content less than 20 per cent have been precipitated and separating the precipitate from the liquid phase, (2) further distilling said liquid phase at a pressure not above 10 inches of mercury absolute until from 20 to 50 per cent of the initial copper has been precipitated and separating the precipitate and returning it to the starting solution, (3) distilling the liquid phase from step (2) at a high enough temperature and for a time sufficient to precipitate the remaining copper therefrom as carbonate and oxide, (4) dissolving the precipitates from steps (1) and (6) in ammonium carbonate solution, (5) distilling the resulting solution under a pressure not above 10 inches of mercury absolute and removing the nickel-rich precipitate, (6) further distilling the liquid phase from step (5) under a pressure not exceeding 10 inches of mercury absolute whereby to precipitate a nickel containing fraction of basic copper carbonate and returning the precipitate to step (4), (7) distilling the liquid phase from steps (6) under a pressure not exceeding 10 inches of mercury absolute and returning the precipitate to the starting solution.

References Cited in the file of this patent

UNITED STATES PATENTS

| Number | Name | Date |
|---|---|---|
| 654,804 | Rigg | July 31, 1900 |
| 689,391 | Frasch | Dec. 24, 1901 |
| 1,204,843 | Bretherton et al. | Nov. 14, 1916 |
| 1,487,145 | Caron | Mar. 18, 1924 |
| 1,879,834 | Waring et al. | Sept. 27, 1932 |
| 2,290,313 | Caron | July 21, 1942 |
| 2,400,114 | Hills | May 14, 1946 |
| 2,488,201 | Kenney et al. | Nov. 15, 1949 |
| 2,531,336 | Hills et al. | Nov. 21, 1950 |
| 2,576,314 | Forward | Nov. 27, 1951 |
| 2,588,265 | McGauley | Mar. 4, 1952 |

FOREIGN PATENTS

| Number | Country | Date |
|---|---|---|
| 2,775 | Australia | July 13, 1926 |

OTHER REFERENCES

"The Canadian Mining and Metallurgical Bulletin," June 1948, Number 434, pages 350-355.

Lidell, "Handbook of Non-Ferrous Metallurgy," vol. II, Recovery of the Metals, McGraw-Hill Book Co., N. Y., 1945, pages 352-353.